(12) United States Patent
Mizukami et al.

(10) Patent No.: US 8,502,427 B2
(45) Date of Patent: *Aug. 6, 2013

(54) MOTOR AND ELECTRIC DEVICE USING SAME

(75) Inventors: Hirofumi Mizukami, Osaka (JP); Akihiko Watanabe, Osaka (JP); Takehiko Hasegawa, Osaka (JP); Haruhiko Kado, Osaka (JP)

(73) Assignee: Panasonic Corporation, Osaka (JP)

( * ) Notice: Subject to any disclaimer, the term of this patent is extended or adjusted under 35 U.S.C. 154(b) by 1 day.

This patent is subject to a terminal disclaimer.

(21) Appl. No.: 13/132,264

(22) PCT Filed: Dec. 11, 2009

(86) PCT No.: PCT/JP2009/006782
§ 371 (c)(1),
(2), (4) Date: Jun. 1, 2011

(87) PCT Pub. No.: WO2010/067616
PCT Pub. Date: Jun. 17, 2010

(65) Prior Publication Data
US 2011/0234026 A1      Sep. 29, 2011

(30) Foreign Application Priority Data
Dec. 12, 2008    (JP) .................................. 2008-316377

(51) Int. Cl.
*H02K 3/30* (2006.01)
(52) U.S. Cl.
USPC ........................................................... 310/72

(58) Field of Classification Search
USPC ...................... 310/66, 68 R, 72, 89
See application file for complete search history.

(56) References Cited

U.S. PATENT DOCUMENTS

| 4,126,933 | A | * | 11/1978 | Anderson et al. | 29/598 |
| 4,263,711 | A | * | 4/1981 | Sakano et al. | 29/597 |
| 6,002,185 | A | * | 12/1999 | Nakao et al. | 310/43 |
| 6,069,431 | A | * | 5/2000 | Satoh et al. | 310/260 |
| 6,673,463 | B1 | * | 1/2004 | Onishi et al. | 428/480 |

(Continued)

FOREIGN PATENT DOCUMENTS

| GB | 1 508 793 | 4/1978 |
| JP | 10-028350 A | 1/1998 |

(Continued)

OTHER PUBLICATIONS

International Search Report for International Application No. PCT/JP2009/006782, dated Jan. 26, 2010, 1 page.

(Continued)

Primary Examiner — Tran Nguyen
(74) Attorney, Agent, or Firm — Brinks Hofer Gilson & Lione

(57) ABSTRACT

A motor includes: a stator including a stator iron core on which a winding is wound; a rotor including a rotating body that holds a magnet in a circumferential direction to face the stator and a shaft that fastens the rotating body to penetrate a center of the rotating body; a bearing that supports the shaft; and two conductive brackets that fix the bearing. The two brackets are electrically connected to each other, and a capacitor serving as an impedance adjusting member that adjusts impedances between the stator iron core and the electrically connected two brackets is arranged.

10 Claims, 14 Drawing Sheets

U.S. PATENT DOCUMENTS

2008/0042499 A1 2/2008 Okada
2010/0253158 A1* 10/2010 Mizukami et al. ............. 310/43
2012/0038229 A1* 2/2012 Watanabe et al. ............. 310/43

FOREIGN PATENT DOCUMENTS

| JP | 2007116839 A | * | 5/2007 |
| JP | 2007-159302 A | | 6/2007 |
| JP | 2008-148453 A | | 6/2008 |
| JP | 2008-263698 A | | 10/2008 |
| WO | WO 2009001546 A1 | * | 12/2008 |

OTHER PUBLICATIONS

European Search Report in corresponding European Application No. 09831722.5, dated Jul. 31, 2012, 9 pages.

* cited by examiner

MOTOR AND ELECTRIC DEVICE USING SAME

This application is a 371 application of PCT/JP2009/006782 having an international filing date of Dec. 11, 2009, which claims priority to JP2008-316377 filed on Dec. 12, 2008, the entire contents of which are incorporated herein by reference.

TECHNICAL FIELD

The present invention relates to motors and electric devices using the same and, more particularly, to a motor that is improved to suppress electric corrosion from occurring in a bearing and an electric device using the same.

BACKGROUND ART

In recent years, a motor has often employed a method in which a motor is driven by an inverter using a pulse width modulation system (to be arbitrarily referred to as a PWM system hereinafter). In the inverter driving of the PWM system, since a neutral-point potential of a winding is not zero, a potential difference (to be referred to as a shaft voltage hereinafter) is generated between an outer ring and an inner ring of a bearing. The shaft voltage includes a high-frequency component obtained by switching. When the shaft voltage reaches a breakdown voltage of an oil film in the bearing, a minute electric current flows in the bearing to cause electric corrosion in the bearing. When the electric corrosion progresses, a wavelike abrasion phenomenon may occur on a bearing inner ring, a bearing outer ring, or bearing balls to generate abnormal sound, and the abnormal sound is one main factor of drawback in the motor.

A power supply circuit of a drive circuit (including a control circuit or the like) that inverter-drives a motor by a PWM system, a primary circuit of the power supply circuit, and the earth on the primary circuit side are electrically insulated from each other.

Conventionally, in order to suppress electric corrosion, the following measure is conceived.

(1) The bearing inner ring and the bearing outer ring are electrically conductive to each other.

(2) The bearing inner ring and the bearing outer ring are electrically insulated from each other.

(3) A shaft voltage is reduced.

As a concrete method for the (1), a method of giving conductivity to a lubricant agent of the bearing is given. However, a conductive lubricant agent is deteriorated in conductivity with elapsed time, and lacks in sliding reliability. A method of arranging a brush on a rotating shaft to set a conductive state may be conceived. However, this method disadvantageously requires brush abrasion powder or a space.

As a concrete method of the (2), a method of changing iron balls in the bearing with nonconducting ceramic balls is given. This method highly effectively suppresses electric corrosion but disadvantageously has high cost. The method cannot be employed in a general-purpose motor.

As a concrete method of the (3), a method of electrically short-circuiting a stator iron core to a conductive metal bracket to change a capacitance to reduce shaft voltage is conventionally known (for example, see Patent Document 1). As conventional techniques that suppress electric corrosion of bearings of motors, a large number of configurations in each of which a stator iron core or the like of a motor is electrically connected to the earth are disclosed.

An impedance obtained when an electric capacity and a resistor element are connected in parallel with each other is expressed by a relational expression: $Z=1/j\omega C+R$. In this expression, Z denotes an impedance, j denotes an imaginary number, $\omega$ denotes an angular frequency, C denotes a capacitance, and R denotes a resistance. As is apparent from expression, when the capacitance increases or when the resistance decreases, the impedance decreases. In contrast to this, when the capacitance decreases or when the resistance increases, the impedance increases.

In Patent Document 1, the stator iron core and the bracket are short-circuited to decrease an impedance on the stator side. In this manner, the bearing is suppressed from being electrically corroded.

More specifically, in general, a motor that is used in a washing machine, a dishwasher, or the like near water and that may electrocute a person needs not only to have a charging unit insulated (basic insulation) but also to be additionally independently insulated (to be referred to as additional insulation hereinafter). On the other hand, since a motor that is used in an indoor unit or an outdoor unit of an air conditioner, a water heater, an air purifier, or the like in addition to a washing machine, a dishwasher, or the like may not electrocute a person, the motor does not require additional insulation. Therefore, since the motor that is used in an indoor unit or an outdoor unit of an air conditioner, a water heater, an air purifier, or the like does not have an insulated rotor, an impedance on the rotor side (bearing inner ring side) is at a low level. In contrast to this, since the stator side (bearing outer ring side) has an insulated structure, an impedance is at a high level. In this case, voltage drops caused by impedances are different from each other. Since a potential on the bearing inner ring side and a potential on the bearing outer ring side are high and low, respectively, an imbalanced state occurs, and a high shaft voltage is generated. The high shaft voltage may cause electric corrosion in the bearing.

In order to avoid the state, Patent Document 1 employs a method that short-circuits the stator iron core and the bracket to each other to eliminate a capacitance component therebetween and, as described above, decreases the impedance on the stator side (bearing outer ring side) to approximate the impedance to the impedance on the rotor side (bearing inner ring side).

In recent years, a molded motor the reliability of which is improved by molding a fixing member such as a stator iron core on a stator side with a molding material is proposed. For this reason, a bearing may be fixed with the insulating molding material in place of a metal bracket to suppress an unnecessary high-frequency voltage generated on the bearing outer ring side and an unnecessary high-frequency current flowing between the inner ring and the outer ring of the bearing. However, the molding material is a resin that is not strong enough to fix the bearing and has poor dimensional accuracy for resin molding, and creeping in the bearing disadvantageously easily occurs. More specifically, in a shaft bearing such as a bearing, in general, for example, when a void is formed between an outer ring and a housing inner circumferential surface, a force in a radial direction is generated on a shaft by a transmission load. When such a force is generated, a slipping phenomenon is easily generated by a relative difference in a radial direction. The sleeping phenomenon is called creeping. The creeping, in general, can be suppressed by strongly fixing the outer ring to a housing such as a bracket. In recent years, with the progress of a recent high-power motor, a bearing needs to be more strongly fixed. For this reason, for example, as a countermeasure against creeping, a metal bracket processed with a steel plate in advance and having preferable dimensional accuracy must be employed to fix a bearing. Especially, a general bearing has a structure in which a rotating shaft is supported at two positions. However, in terms of the strength described here, because of the easiness of execution and the like, the shaft is preferably fixed to two bearings with metal brackets.

However, the conventional method as described in Patent Document 1 has the following problem. More specifically, since the conventional method is a method using short-circuiting, an impedance cannot be adjusted, and a shaft voltage may increase depending on a magnet material or a structure of a rotor. More specifically, by the short-circuiting serving as the conventional method, an impedance on the stator side decreases considerably more than the impedance on the rotor side. In this manner, a high shaft voltage may be generated.

Because of the strength described above, when the two bearings are fixed with two metal brackets, in general, shapes and arrangement states of one bracket and the other bracket are different from each other. For this reason, the impedances of both the brackets are different from each other. For this reason, a potential induced by one bracket is different from a potential induced by the other bracket. For this reason, the shaft voltages of the two bearings are also different from each other. Even though electric corrosion does not occur in one bearing, electric corrosion may disadvantageously occur in the other bearing.

In the configuration in the problem of the application, as described above, a power supply circuit of a drive circuit (including a control circuit or the like) that inverter-drives a motor by a PWM system, a primary circuit of the power supply circuit, and the earth on the primary circuit side are electrically insulated from each other. Therefore, it is difficult to employ a conventional configuration in which a stator iron core or the like of a motor is electrically connected to the earth and to solve the problem by a configuration added with the conventional technique because still another problem is posed in terms of specifications and characteristics of a motor. Patent Document 1: Unexamined Japanese Patent Publication No. 2007-159302

DISCLOSURE OF THE INVENTION

The present invention provides a motor in which electric corrosion is suppressed from occurring in a bearing and an electric device using the same. The motor according to the present invention includes: a stator including a stator iron core on which a winding is wound; a rotor including a rotating body that holds a permanent magnet in a circumferential direction to face the stator and a shaft that fastens the rotating body to penetrate a center of the rotating body; a bearing that supports the shaft; and two conductive brackets that fix the bearing, wherein the two brackets are electrically connected to each other, and the motor further includes an impedance adjusting member for adjusting an impedance between the stator iron core and the electrically connected two brackets.

With the above configuration, the two brackets are electrically connected to cause both the brackets to have the same potential, a potential difference between the inner ring and the outer ring of one bearing and a potential difference between the inner ring and the outer ring of the other bearing are approximated to each other or equal to each other. The impedance adjusting member is arranged between the stator iron core and the brackets connected to each other to make it possible to adjust an impedance on a stator side. More specifically, as described above, in the conventional configuration, an impedance on rotor side is low, and the impedance on the stator side is high. In contrast to this, in the configuration of the present invention, on the stator side, both the brackets have the same potentials, the impedance adjusting member is arranged to decrease the impedance on the stator side, and the impedance on the stator side is matched with the impedance on the rotor side having a low impedance. For this reason, the potential of the bearing inner ring can be made almost equal to the potential of the outer ring of the corresponding bearing, the shaft voltages of the bearings can be lowered. In this manner, since a potential difference between the inner ring and the outer ring of each of the two bearings fixed with the conductive brackets can be lowered, the bearing can be suppressed from being electrically corroded by a high-frequency wave caused by PWM or the like while securing the fixing strength of the bearing.

DETAILED DESCRIPTION OF THE PREFERRED EMBODIMENTS

A best mode for carrying out the present invention will be described below with reference to the drawings.

Embodiment 1

Figure 1:
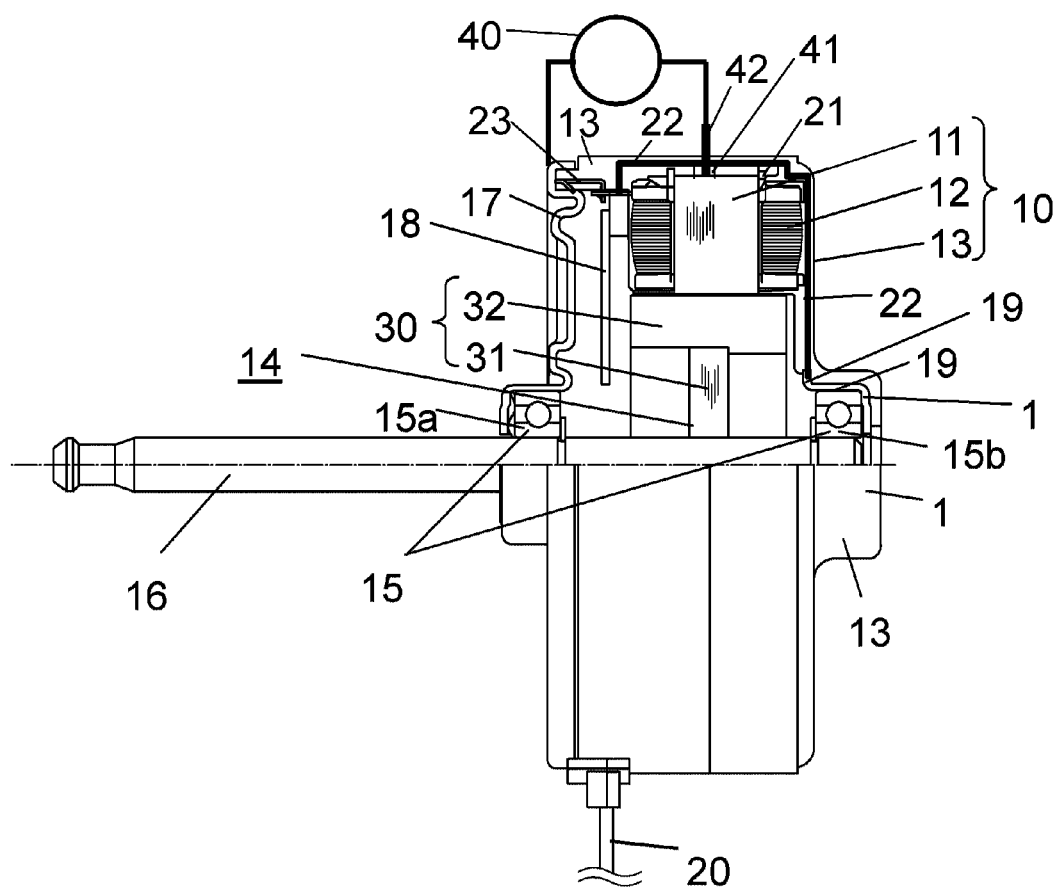
FIG. 1 is a structural diagram showing a cross section of a brushless motor according to Embodiment 1 of the present invention.

FIG. 1 is a structural diagram showing a cross section of a brushless motor according to Embodiment 1 of the present invention. In the present embodiment, an example of a brushless motor that is a motor to drive a blowing fan mounted for an air conditioner serving as an electric device will be described. In the present embodiment, an example of an inner rotor type brushless motor in which a rotor is rotatably arranged on an inner circumference side of a stator will be described.

In FIG. 1, on stator iron core 11, stator winding 12 is wound on insulator 21 serving as a resin to insulate stator iron core 11. Stator iron core 11 is molded together with another fixing member with insulating resin 13 serving as a molding material. In the present embodiment, the members are integrally molded to configure stator 10 having a generally cylindrical shape as an outer shape.

Inside stator 10, rotor 14 is inserted via a gap. Rotor 14 has disk-like rotating body 30 including rotor iron core 31 serving as a metal iron core and shaft 16 that fastens rotating body 30 to penetrate the center of rotating body 30. Rotating body 30 holds magnet 32 serving as a permanent magnet such as a ferrite resin magnet in a circumferential direction to face the inner circumference side of stator 10. In this manner, the inner circumference side of stator 10 and an outer circumference side of rotating body 30 are arranged to face each other.

Two bearings 15 that support shaft 16 are fixed to shaft 16 of rotor 14. Bearing 15 is a cylindrical bearing having a plurality of iron balls, and an inner ring side of bearings 15 is fixed to shaft 16. In FIG. 1, on an output shaft side serving as a side on which shaft 16 projects from a brushless motor body, bearing 15a supports shaft 16. On the opposite side (to be referred to as an anti-output shaft side hereinafter), bearing 15b supports shaft 16. Outer ring sides of bearing 15 are fixed with metal brackets having conductivity, respectively. In FIG. 1, bearing 15a on the output shaft side is fixed with bracket 17, bearing 15b on the anti-output shaft side is fixed with bracket 19. With this configuration, shaft 16 is supported by two bearings 15, and rotor 14 is rotatably rotated.

Furthermore, in the brushless motor, printed wiring board 18 on which a drive circuit including a control circuit is mounted is built in. After printed wiring board 18 is built in, bracket 17 is press-fitted in stator 10 to form a brushless motor. Connection wiring 20 for a power supply of the drive circuit, a ground line, and r a control signal are connected to printed wiring board 18.

A zero potential point on printed wiring board 18 on which the drive circuit is mounted is insulated from the earth and a primary (power supply) circuit and floats on the earth and the potential of the primary power supply circuit. In this case, the zero potential point is a wiring point having a zero-volt potential serving as a reference potential on printed wiring board 18, and, in general, indicates a ground line called a ground. The ground line included in the connection wirings 20 is connected to the zero potential point, i.e., the ground line. A power supply circuit that is connected to printed wiring board 18 on which the drive circuit is mounted and supplies a power supply voltage for the winding, a power supply circuit that supplies a power supply voltage for the control circuit, the lead wiring for a control voltage and the ground line for the control circuit, and the like are insulated from the earth. More specifically, the power supply circuits, the ground line, and the like are electrically insulated from all a primary (power supply) circuit for the power supply circuit that supplies the power supply voltage for the winding, a primary (power supply) circuit for the power supply circuit that supplies the power supply voltage for the control circuit, the earth connected to the primary (power supply) circuits, and the earth that is independently grounded.

More specifically, since the drive circuits mounted on printed wiring board 18 are electrically insulated from the primary (power supply) circuit potential and the potential of the earth, the drive circuits are in a floating state. This is a state in which the potential floats. For this reason, a configuration including the power supply circuit that supplies the power supply voltage for the winding and the power supply circuit that supplies the power supply voltage for the control circuit, the power supply circuits being connected to printed wiring board 18, is also called a floating power supply.

In the present embodiment, insulated conducting pin 22 is integrally molded while being electrically connected to bracket 19 in advance. On an end face on the output shaft side of stator 10, a distal end of conducting pin 22 is exposed. Conducting pin 23 having a relay portion is further connected to a distal end of conducting pin 22 to be electrically connected to bracket 17. Conductivity between bracket 17 and conducting pin 23 is secured when bracket 17 is press-fitted in stator 10. With the configuration, bracket 17 and bracket 19 are electrically connected to each other while being insulated from stator iron core 11 in the motor.

In the present embodiment, as a further characteristic feature, capacitor 40 serving as a dielectric element is electrically connected between stator iron core 11 and bracket 17. In order to execute the connection, through hole 41 is formed in a part of insulating resin 13 serving as a molding material to cause one end of connection pin 42 connected to stator iron core 11 to project through hole 41. One end of capacitor 40 is connected to connection pin 42, and the other end of capacitor 40 is connected to bracket 17.

When the power supply voltages and a control signal are supplied to the brushless motor configured as described above through connection wiring 20, the drive circuit on printed wiring board 18 causes a drive current to flow in stator winding 12, and a magnetic field is generated from stator iron core 11. By the magnetic field from stator iron core 11 and the magnetic field from magnet 32, an attractive force and a repulsive force are generated depending on the polarities of the magnetic fields, and the forces rotate rotor 14 about shaft 16.

A more detailed configuration of the brushless motor will be described below.

In the brushless motor, as described above, shaft 16 is supported by two bearings 15, and bearings 15 are fixed and supported by brackets, respectively. In order to suppress a drawback by the creeping described above, in the present embodiment, the bearings 15 are fixed with metal brackets having conductivity, respectively. More specifically, in the present embodiment, conductive brackets processed with a steel plate in advance and having preferable dimensional accuracy are employed to fix bearings 15. In particular, when a high-output motor is required, the configuration described above is more preferable.

More specifically, bearing 15b on the anti-output shaft side is fixed with bracket 19 having a size almost equal to an outer circumference diameter of bearing 15b. Bracket 19 is integrally molded together with insulating resin 13. More specifically, as shown in FIG. 1, the shape of insulating resin 13 on the anti-output shaft side is a shape including main-body projecting portion 13a projecting from the main body of the brushless motor toward the anti-output shaft. Bracket 19 is arranged on the inner side of the main body of main-body projecting portion 13a as an inner bracket to integrally mold insulating resin 13 and bracket 19. Bracket 19 has a cup-like shape that is a hollow cylindrical shape. More specifically, bracket 19 has cylindrical portion 19a having an opening at one end and annular fringe portion 19b slightly extending from the cylindrical end portion on the opening side to the outside. The inner circumference diameter of cylindrical portion 19a is almost equal to the outer circumference diameter of bearing 15b. Bearing 15b is inserted into cylindrical portion 19a to also fix bearing 15b to insulating resin 13 via bracket 19. With the configuration, since the outer ring side of bearing 15b is fixed to metal bracket 19, a drawback caused by creeping can be suppressed. The outer circumference diameter of fringe portion 19b is set to be slightly larger than the outer circumference diameter of bearing 15b. More specifically, the outer circumference diameter of fringe portion 19b is set to be larger than the outer circumference diameter of bearing 15b and smaller than at least the outer circumference diameter of rotating body 30. When bracket 19 is designed to have the above shape, a metal material that increases the cost is suppressed from being used in comparison with a structure in which, for example, a fringe portion extends to stator iron core 11 over the outer circumference of rotating body 30. Metal bracket 19 is suppressed from increasing in area as described above, and bracket 19 is integrally molded together with insulating resin 13 to cover the outer edge of bracket 19 with insulating resin 13. For this reason, noise can be suppressed from being generated from bearing 15b.

Bearing 15a on the output shaft side is fixed by bracket 17 having an outer circumference diameter almost equal to an outer circumference diameter of stator 10. Bracket 17 has a generally disk-like shape and has a projecting portion having a diameter almost equal to the outer circumference diameter of bearing 15a at the center of the disk, and the inner side of the projecting portion is hollow. After printed wiring board 18 is built in, bearing 15a is inserted into the inside of the projecting portion of bracket 17 to arrange bearing 15a in the inside, and bracket 17 is press-fitted in stator 10 to fit a connection end portion arranged on the outer circumference of bracket 17 and a connection end portion of stator 10 to each other. In this manner, the brushless motor is formed. With the above configuration, an assembling operation is made easy, and the outer ring side of bearing 15a is fixed to metal bracket 17. For this reason, a drawback caused by creeping is suppressed.

For the meantime, since metal shaft 16 is inserted into the inner ring sides of two bearings 15, the inner rings of bearings 15 necessarily have the same potential. On the other hand, the outer rings of two bearings 15 are structured to be stored in bracket 17 and bracket 19, respectively. However, bracket 17 and bracket 19 are arranged on both the sides of the stator, i.e., on the output shaft side and the anti-output shaft, respectively. For this reason, the two brackets do not generally have the same potential. In the present embodiment, in order to made the potentials of the two brackets, i.e., bracket 17 and bracket 19 equal to each other, both the brackets are electrically connected by conducting pin 22 and conducting pin 23.

In order to connect bracket 17 and bracket 19 to each other, conducting pin 22 serving as a conducting member is electrically connected to bracket 19 in advance. More specifically, as shown in FIG. 1, one distal end portion of conducting pin 22 is connected to fringe portion 19b of bracket 19. Conducting pin 22 is arranged in insulating resin 13 in the motor, and, like bracket 19, conducting pin 22 is integrally molded together with insulating resin 13. In this manner, when conducting pin 22 is arranged in insulating resin 13, conducting pin 22 is protected from rust or external force to obtain a reliable electric connection with respect to a using environment, external stress, or the like. Conducting pin 22 extends from fringe portion 19b toward the outer circumference of the brushless motor in insulating resin 13, and conducting pin 22 further extends from a position near the outer circumference of the brushless motor to the output shaft side in almost parallel with shaft 16. The other distal end portion of conducting pin 22 is exposed from an end face of insulating resin 13 on the output shaft side. Conducting pin 23 to be electrically connected to bracket 19 is further connected to the other distal end portion of conducting pin 22, and conducting pin 23 extends to the output shaft side. More specifically, when bracket 17 is press-fitted in stator 10, the distal end portion of conducting pin 23 is brought into contact with bracket 17 to secure conductivity between bracket 17 and conducting pin 23. With the configuration, the two brackets including bracket 17 and bracket 19 are electrically connected to each other through conducting pin 22 and conducting pin 23. In a state in which bracket 17 and bracket 19 are insulated from stator iron core 11 by insulating resin 13, the two brackets are electrically connected to each other.

In order to connect stator iron core 11 and bracket 17 to each other through capacitor 40, more specifically, a part of insulating resin 13 located on a side surface of stator iron core 11 is cut to form through hole 41, and a part of stator iron core 11 is exposed. One end of connection pin 42 is connected to a part of exposed stator iron core 11 through hole 41. Furthermore, one end of capacitor 40 is connected to the other end of connection pin 42, and the other end of capacitor 40 is connected to bracket 17.

In the present embodiment, capacitor 40 serving as an element having an impedance component is arranged as an impedance adjusting member to adjust impedances between stator iron core 11 and the outer rings of bearing 15a on the output shaft side and bearing 15b on the anti-output shaft side. More specifically, in order to match the impedances to make the impedances between stator iron core 11 and the outer rings of bearing 15a on the output shaft side and bearing 15b on the anti-output shaft side approximate to or equal to the impedances between stator iron core 11 and the inner ring of bearing 15a on the output shaft side and bearing 15b on the anti-output shaft side, respectively, capacitor 40 is arranged between stator iron core 11 and bracket 17. More specifically, when capacitor 40 is arranged between stator iron core 11 and bracket 17 as a matching member that matches the impedances therebetween, the impedances between stator iron core 11 and the outer rings of bearing 15a on the output shaft side and bearing 15b on the anti-output shaft side are adjusted. With the above adjustment, the impedances are approximated to each other or equal to each other.

In this manner, in the brushless motor according to the present embodiment, the two brackets including bracket 17 and bracket 19 are electrically connected to each other, and capacitor 40 serving as the impedance adjusting member is arranged between stator iron core 11 and the two brackets electrically connected to each other. With the above configuration, when bracket 17 and bracket 19 are electrically connected, the potentials of both the brackets are made equal to each other, and a potential difference between the inner ring and the outer ring of bearing 15a is made approximate to or equal to a potential difference between the inner ring and the outer ring of bearing 15b. When capacitor 40 connected as described above is arranged, the impedances on stator 10 side can be adjusted. When the impedances are adjusted, the impedances on stator 10 side are appropriately lowered to make it possible to match the impedances on stator 10 side with the impedances on rotor 14 side that are low impedances. When the impedances on stator 10 side and rotor 14 side are matched with each other, the potentials on the inner rings of bearings 15 and the potentials on the outer rings of bearings 15 can be made almost equal to each other, and shaft voltages can be lowered with respect to bearing 15a and bearing 15b. Thus, since the potential differences, i.e., the shaft voltages between the inner rings and the outer rings of the bearings can be lowered with respect to bearing 15a fixed with conductive bracket 17 and bearing 15b fixed with conductive bracket 19, the bearings can be suppressed from being electrically corroded by a high-frequency wave generated by PWM or the like while securing the fixing strengths of the bearings.

In the explanation of the present embodiment, one end of capacitor 40 serving as the impedance adjusting member is connected to bracket 17. However, in place of bracket 17, one end of capacitor 40 may be designed to be connected to bracket 19, conducting pin 22, or conducting pin 23. The impedance adjusting member is not limited to a capacitor serving as dielectric element. At least one of a dielectric element and a resistor element may be used. A plurality of impedance adjusting members may be used to connect stator iron core 11 to bracket 17, bracket 19, and conducting pin 22 or conducting pin 23.

The present embodiment will be described in detail with reference to examples. The present invention is not limited to the following examples. The present invention is not intended to be limited by the examples without departing from the spirit and scope of the invention.

Example 1

In the configuration shown in FIG. 1, dielectric elements having capacitances of 10 pF, 50 pF, 100 pF, 150 pF, and 300 pF were connected in series between bracket 17 and connection pin 42 as capacitors 40 to measure shaft voltages. As the dielectric element, an air variable capacitor (variable capacitor) the capacitance of which can be arbitrarily adjusted was used.

As magnet 32 held by rotor 14, a ferrite resin magnet was used. As bearing 15, 608 available from Minebea Co., Ltd. (grease having a consistency of 239 was used) was used.

Figure 2:
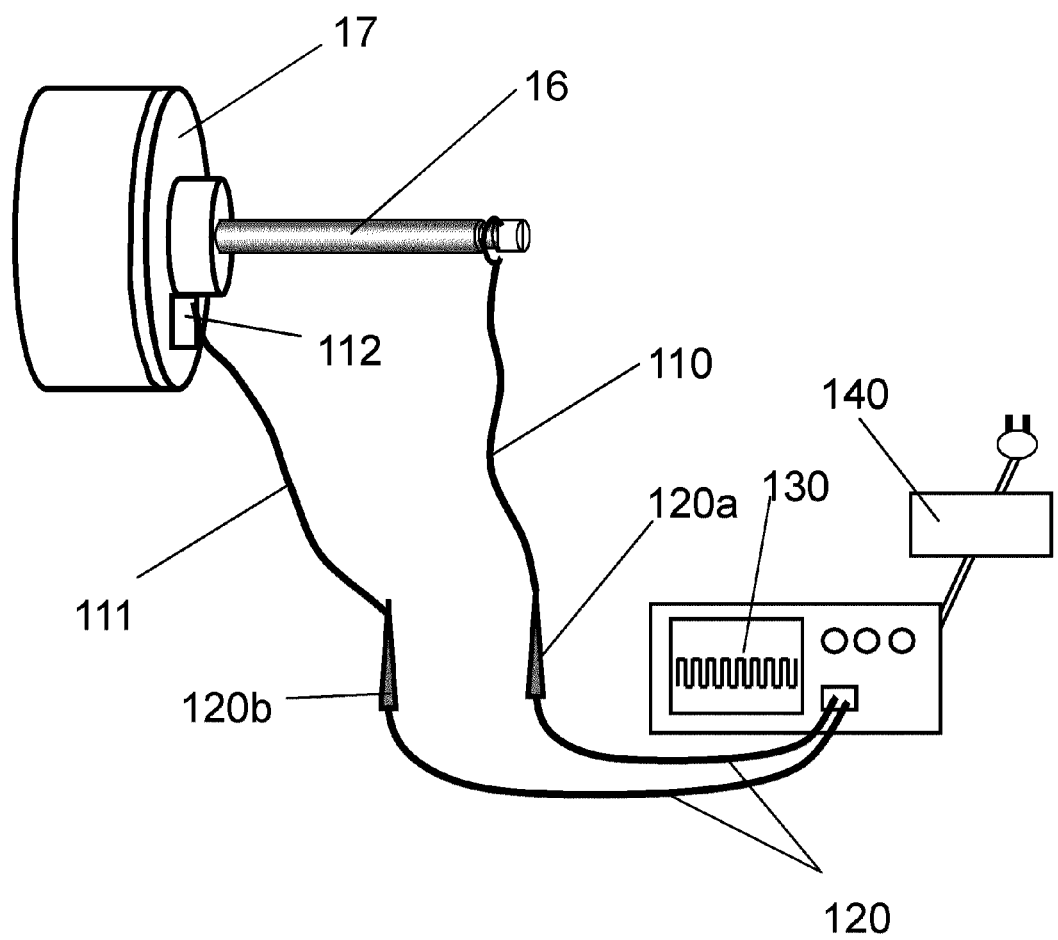
FIG. 2 is a diagram showing a method of measuring a shaft voltage in Example 1.

FIG. 2 is a diagram showing a method of measuring a shaft voltage in Example 1. A DC stabilized power supply was used in a shaft voltage measuring state. The measurement was executed under the same operating conditions in which power supply voltage Vdc of a stator winding was set to 391 V, power supply voltage Vcc of the control circuit was set to 15 V, and a rotating speed was set to 1000 r/min. The rotating speed was adjusted by control voltage Vsp, and an attitude of the brushless motor in an operating state was set to make the shaft horizontal.

In the measurement of the shaft voltage, voltage waveforms were observed with digital oscilloscope 130 (DPO7104 available from Tektronix, Inc.) and high-voltage differential probe 120 (P5205 available from Tektronix, Inc.) to check whether a waveform collapse occurs, and an interpeak measured voltage was set as the shaft voltage.

With respect to the waveform collapses of the shaft voltage were classified in three types, i.e., a complete waveform collapse, a partial waveform collapse, and no waveform collapse.

Figure 3:
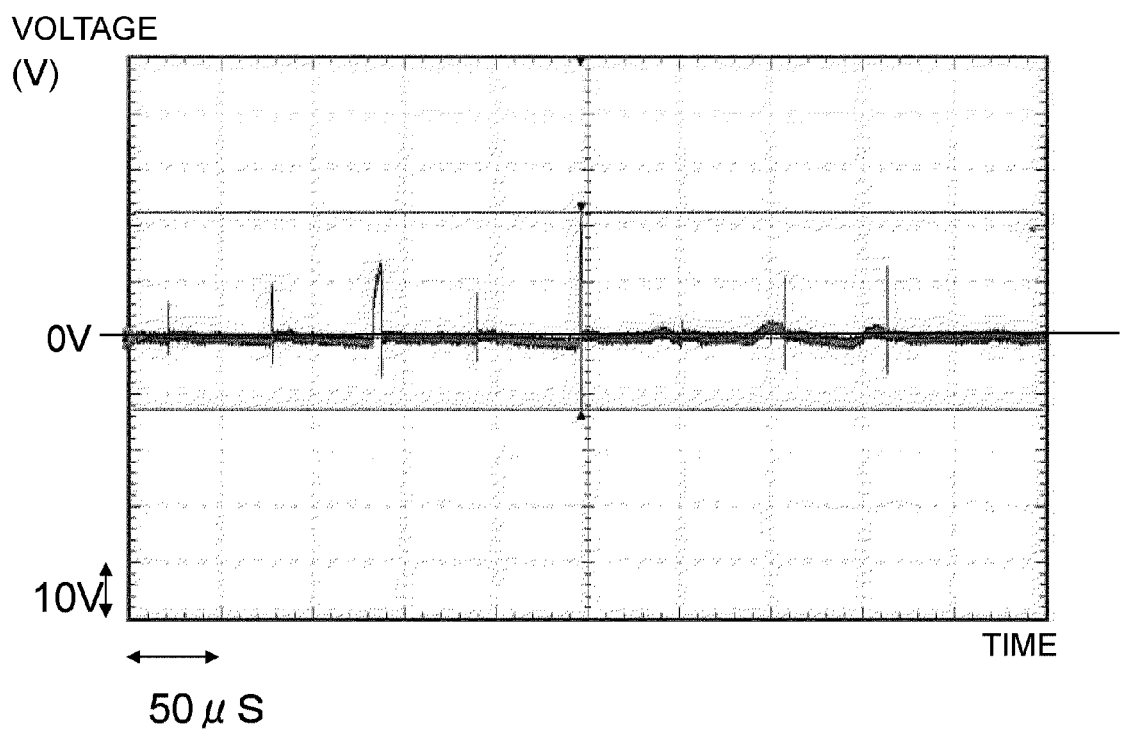
FIG. 3 is a diagram showing an example of complete waveform collapse.
Figure 4:
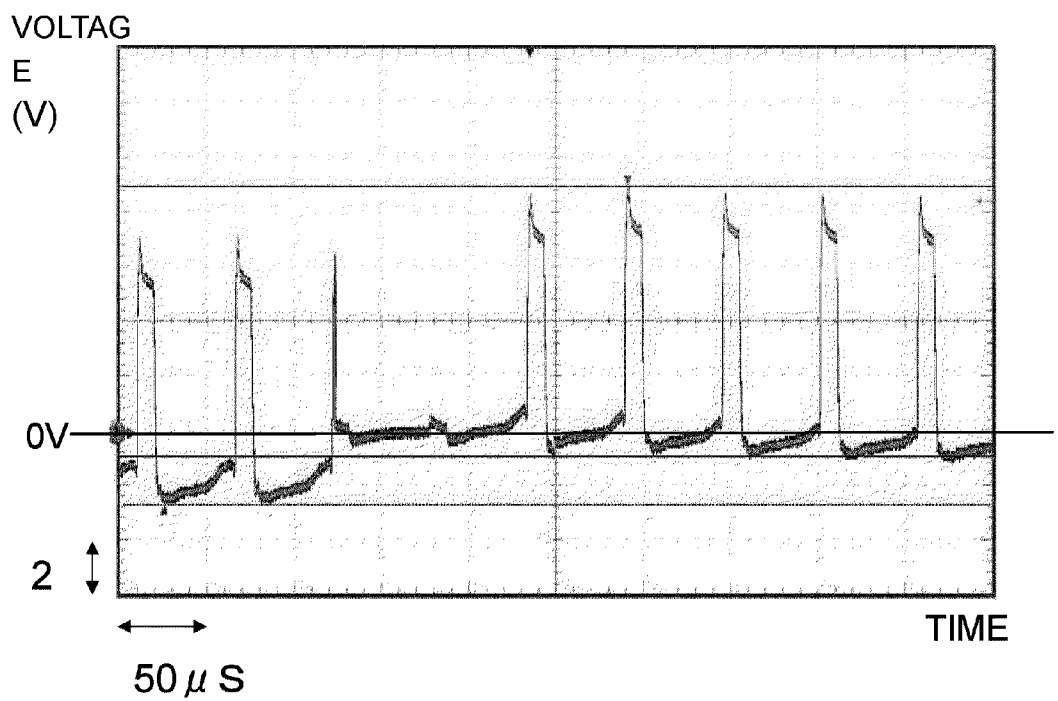
FIG. 4 is a diagram showing an example of a partial waveform collapse.
Figure 5:
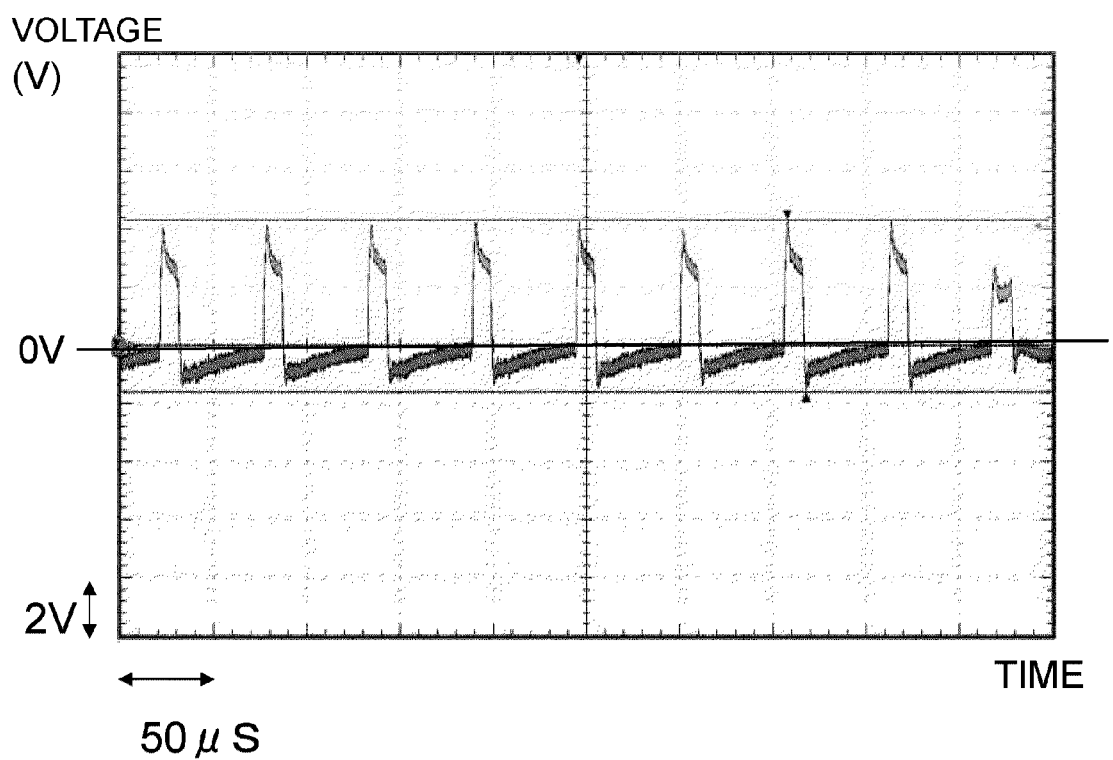
FIG. 5 is a diagram showing an example of no waveform collapse.

FIGS. 3 to 5 are diagrams showing examples of the waveform collapses. FIG. 3 shows a waveform obtained when a complete waveform collapse occurs, FIG. 4 shows a waveform obtained when a partial waveform collapse occurs, and FIG. 5 shows a waveform obtained when no waveform collapse occurs. In FIGS. 3 to 5, time on the abscissa in a measuring state is set to the same condition, i.e., 50 μs/div. Digital oscilloscope 130 is insulated by insulating transformer 140.

In addition, + side 120a of high-voltage differential probe 120 is electrically connected to shaft 16 such that a conductor of a lead wiring is formed in a loop-like shape having a diameter of about 15 mm through lead wiring 110 having a length of about 30 cm to bring the inner circumference of the conductor into conductive contact with the outer circumference of shaft 16. Meanwhile, − side 120b of high-voltage differential probe 120 is electrically connected to bracket 17 such that a distal end of lead wiring 111 is brought into conductive contact with bracket 17 by conductive tape 112 through lead wiring 111 having a length of about 30 cm. With the configuration, a shaft voltage of the bearing on output shaft side that is a voltage between bracket 17 and shaft 16 was measured.

Similarly, with respect to the shaft voltage of the bearing on anti-output shaft, + side 120a of high-voltage differential probe 120 is electrically connected to shaft 16 such that a conductor of a lead wiring is formed in a loop-like shape having a diameter of about 15 mm through lead wiring 110 having a length of about 30 cm to bring the inner circumference of the conductor into conductive contact with the outer circumference of shaft 16. Meanwhile, − side 120b of high-voltage differential probe 120 is electrically connected to a partially exposed portion of bracket 19 obtained by partially cutting a resin portion such that a distal end of lead wiring 111 is brought into conductive contact with bracket 19 by conductive tape 112 through lead wiring 111 having a length of about 30 cm. When bracket 17 and bracket 19 are electrically connected, the shaft voltage is equal to the shaft voltage of the bearing on the output shaft side. For this reason, measurement is omitted.

Figure 6:
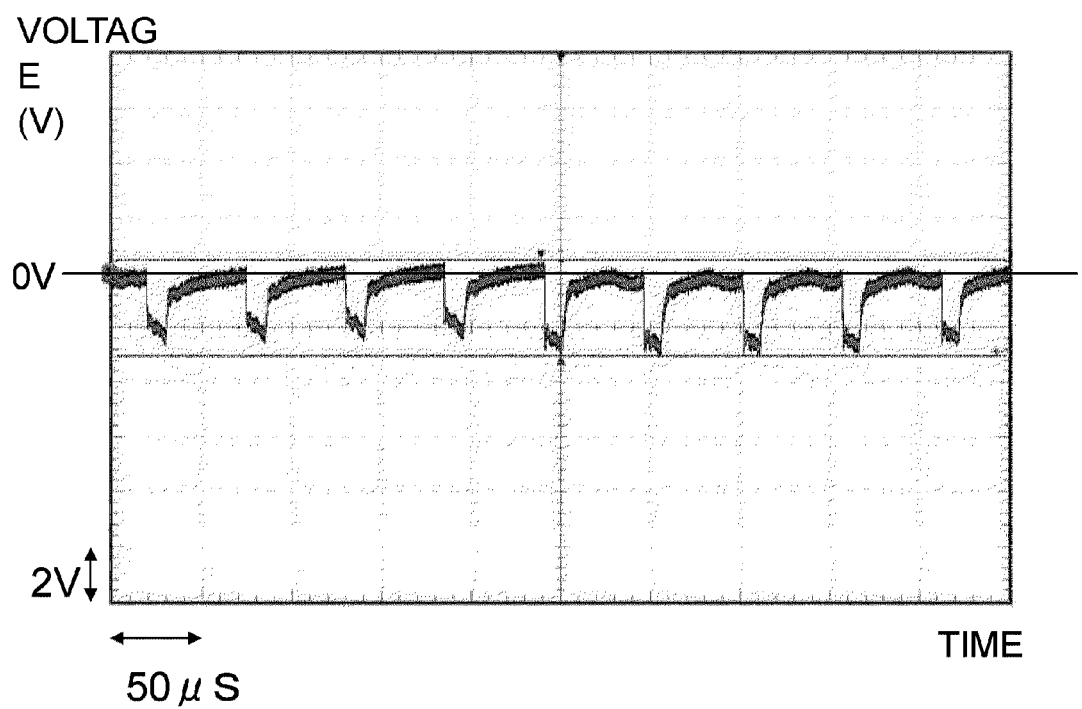
FIG. 6 is a diagram showing a waveform of a shaft voltage when a current flows from a bearing outer ring to a bearing inner ring.

A current direction is determined depending on a direction of a shaft voltage waveform. Since a voltage waveform described in FIGS. 3 to 5 has upward tendency stronger than that of a zero voltage line, it is understood that a potential on shaft 16 (bearing inner ring) side is higher than that on bracket 17 or bracket 19 (bearing outer ring) side. Therefore, it can be determined that the current flows from the bearing inner ring side to the bearing outer ring side. In contrast to this, as shown in FIG. 6, when the voltage wave form has downward tendency stronger than that of the zero voltage line, it can be determined that the current flows from the bearing outer ring side to the bearing inner ring side.

Comparative Example 1

Figure 7:
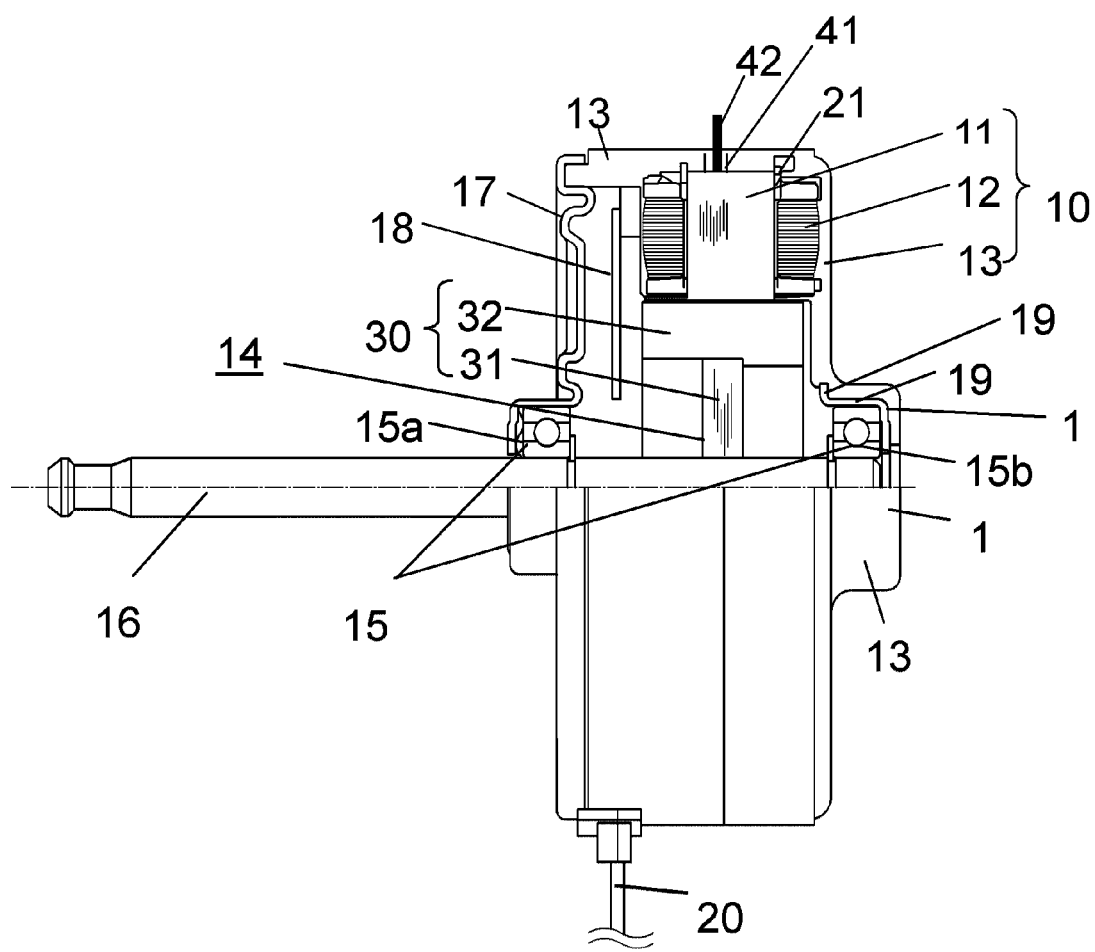
FIG. 7 is a structural diagram showing a cross section of a brushless motor according to Comparative Example 1.
Figure 8:
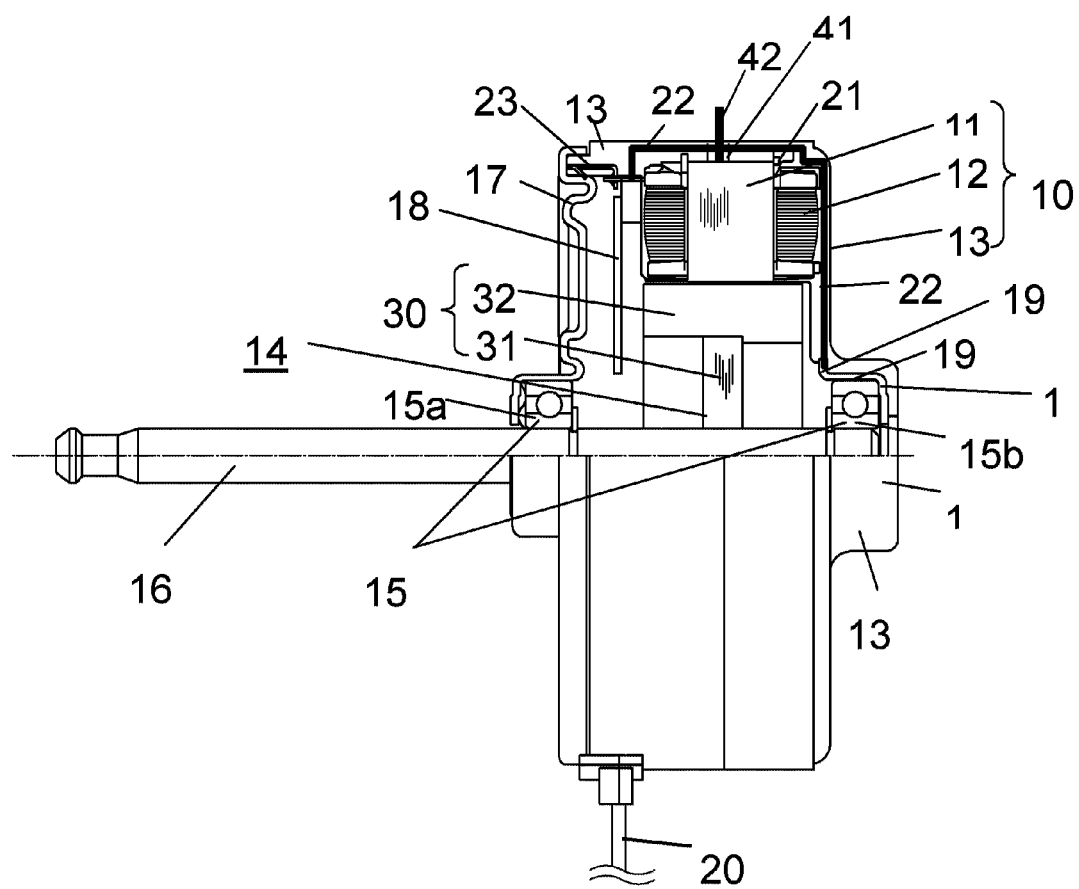
FIG. 8 is a structural diagram showing a cross section of the brushless motor according to Comparative Example 1.

FIG. 7 and FIG. 8 are structural diagrams each showing a cross section of a brushless motor in Comparative Example 1.

As shown in FIG. 7, a brushless motor in which bracket 17 and connection pin 42 are not connected to each other and bracket 17 and bracket 19 are not electrically connected and, as shown in FIG. 8, a brushless motor in which bracket 17 and connection pin 42 are not connected to each other and bracket 17 and bracket 19 are electrically connected to each other were manufactured and evaluated by the same method as that in Example 1.

Comparative Example 2

Figure 9:
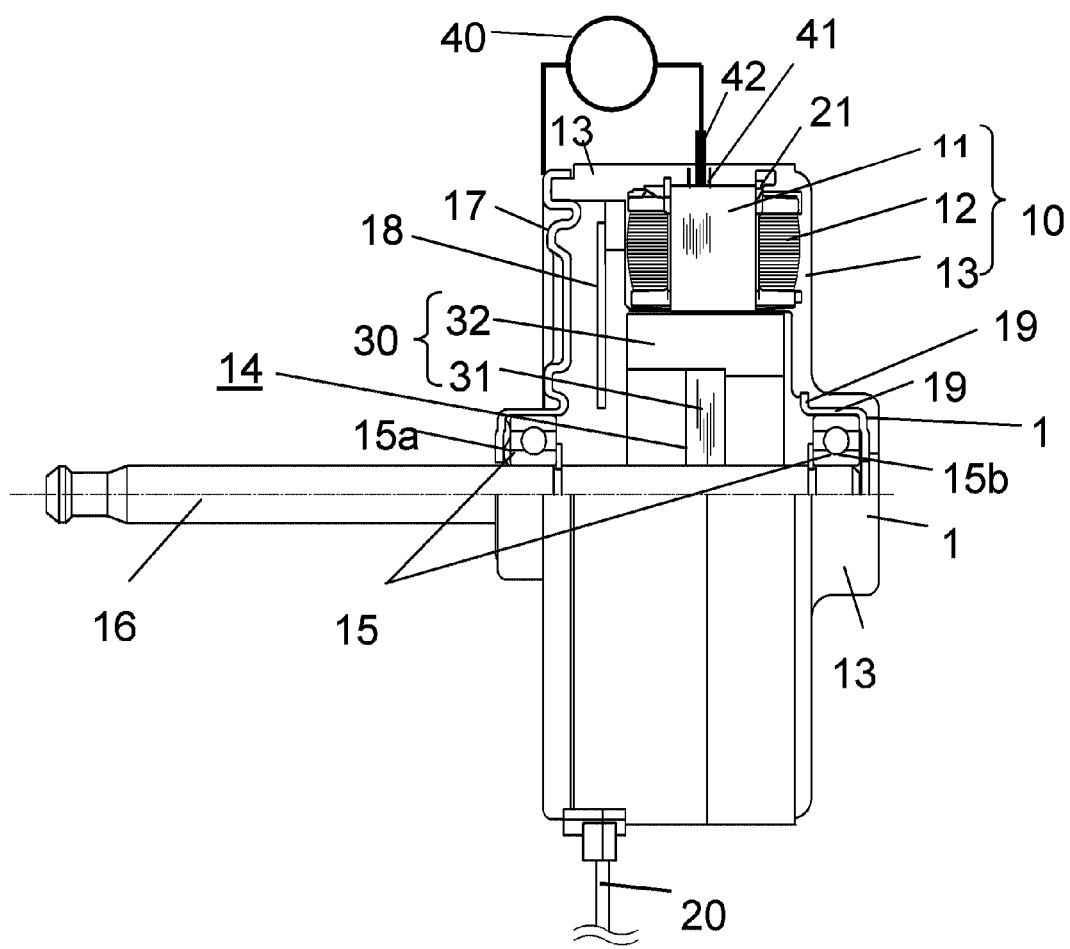
FIG. 9 is a structural diagram showing a cross section of a brushless motor according to Comparative Example 2.

FIG. 9 is a structural diagram showing a cross section of a brushless motor according to Comparative Example 2.

As shown in FIG. 9, in the brushless motor in which bracket 17 and bracket 19 are not electrically connected, dielectric elements having capacities of 10 pF, 50 pF, 100 pF, 150 pF, and 300 pF are connected as capacitors 40 in series between bracket 17 and connection pin 42, and evaluation was executed by the same method as that in Example 1.

Comparative Example 3

Figure 10:
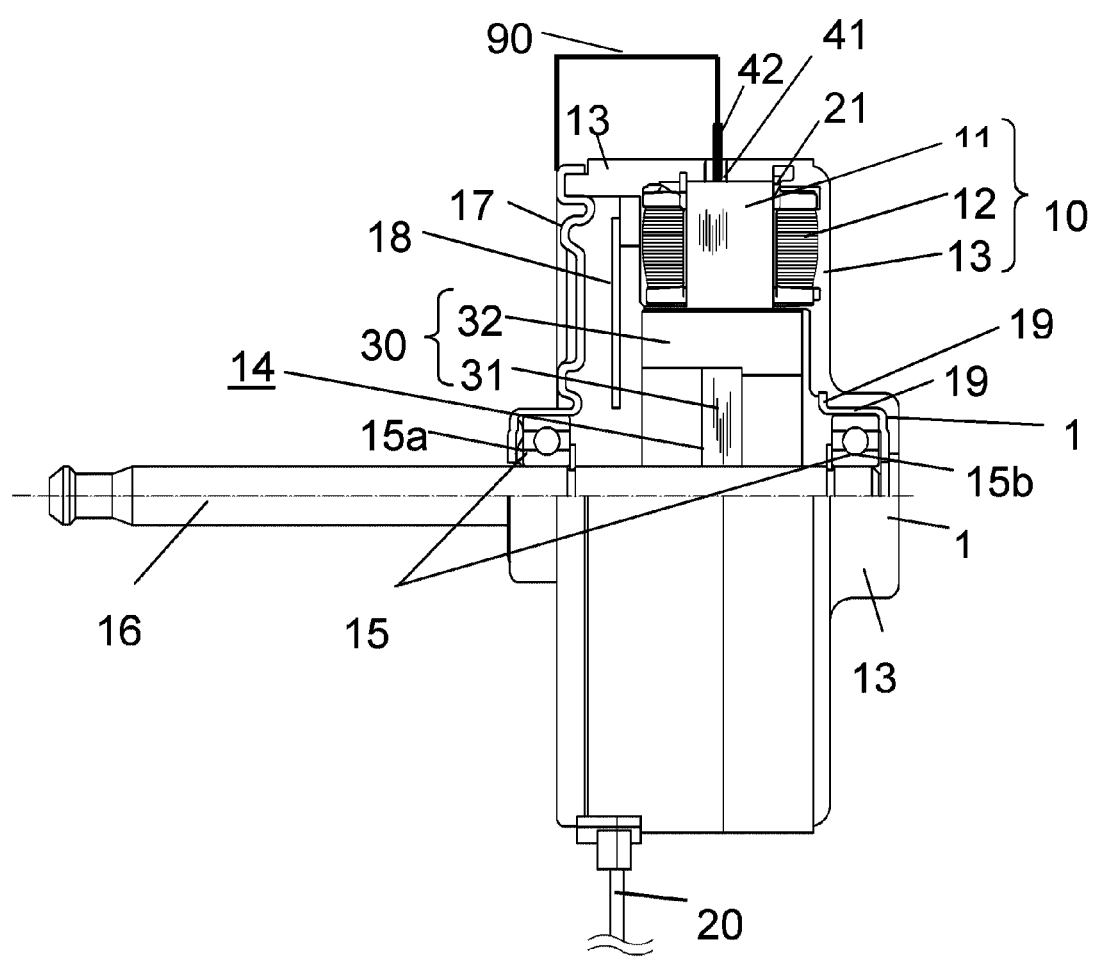
FIG. 10 is a structural diagram showing a cross section of a brushless motor according to Comparative Example 3.
Figure 11:
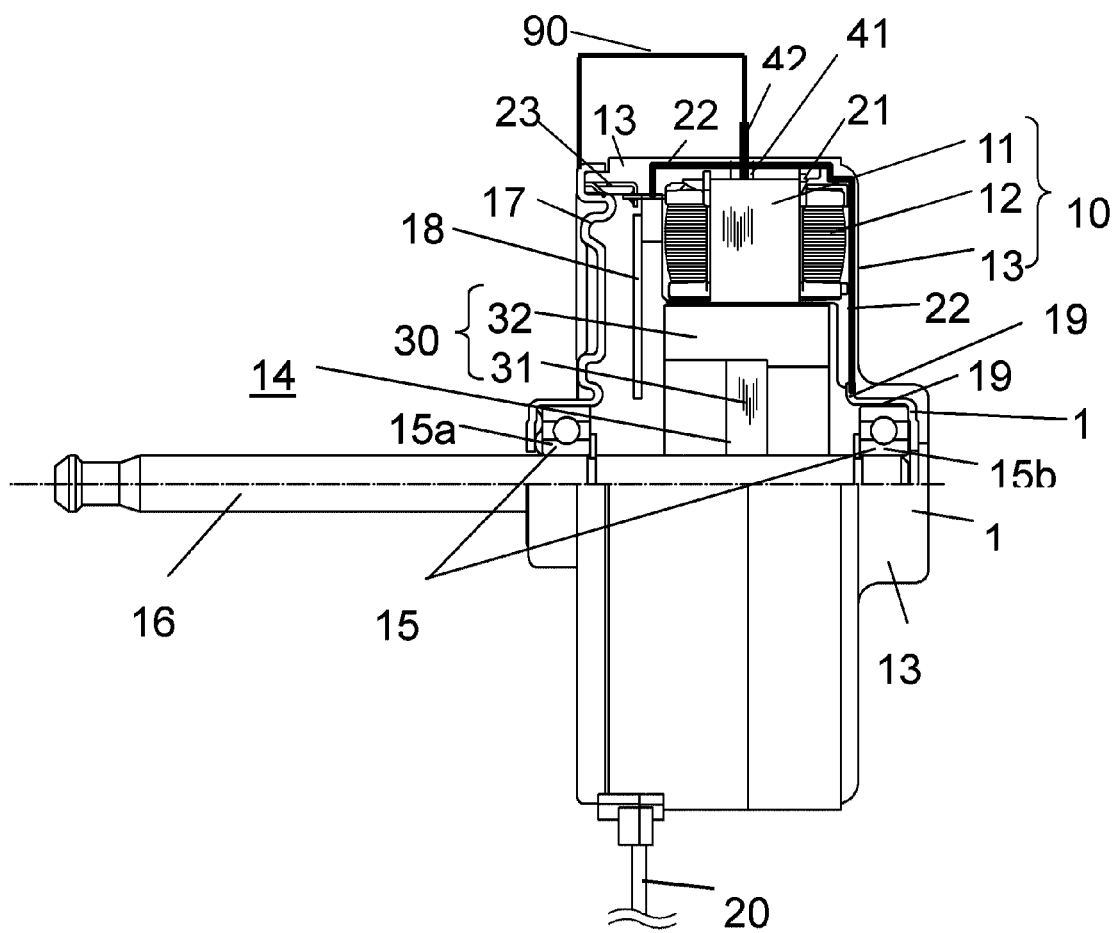
FIG. 11 is a structural diagram showing a cross section of the brushless motor according to Comparative Example 3.

FIG. 10 and FIG. 11 are structural diagrams each showing a cross section of a brushless motor according to Comparative Example 3.

As shown in FIG. 10, a brushless motor in which bracket 17 and connection pin 42 are short-circuited to each other by conducting lead wiring 90 and bracket 17 and bracket 19 are not electrically connected and, as shown in FIG. 11, a brushless motor in which bracket 17 and connection pin 42 are short-circuited to each other by conducting lead wiring 90 and bracket 17 and bracket 19 are electrically connected to each other were manufactured and evaluated by the same method as that in Example 1.

Table 1 shows measurement results of Example 1 and Comparative Examples 1 to 3.

TABLE 1

| | | | Comparative Example 1 | | Comparative Example 2 | | | | |
|---|---|---|---|---|---|---|---|---|---|
| | | | Magnet type of rotor | | | | | | |
| | | | Ferrite resin magnet | | Ferrite resin magnet | | | | |
| | | | | | Capacitance of capacitor connected between stator iron core and bracket | | | | |
| | | pF | Absence of short circuit | 10 | 50 | 100 | 150 | 300 | |
| Conductivity between two brackets | | | Absence | Presence | Absence | | | | |
| Bearing on output shaft side | Shaft voltage | V | 17 | 15 | 10 | 4 | 4 | 6 | 11 |
| | Shaft voltage waveform state | | Complete waveform collapse | Complete waveform collapse | Complete waveform collapse | No waveform collapse | No waveform collapse | Partial waveform collapse | Complete waveform collapse |
| | Direction of shaft voltage waveform | | Upward tendency | Upward tendency | Upward tendency | Upward tendency | Downward tendency | Downward tendency | Downward tendency |
| | Current direction | | Inner ring⇒outer ring | Inner ring⇒outer ring | Inner ring⇒outer ring | Inner ring⇒outer ring | Outer ring⇒inner ring | Outer ring⇒inner ring | Outer ring⇒inner ring |
| Bearing on anti-output shaft side | Shaft voltage | V | 17 | Same as above | 17 | 20 | 17 | 25 | 22 |
| | Shaft voltage waveform state | | Complete waveform collapse | | Complete waveform collapse | Complete waveform collapse | Complete waveform collapse | Complete waveform collapse | Complete waveform collapse |
| | Direction of shaft voltage waveform | | Upward tendency | | Upward tendency | Upward tendency | Upward tendency | Upward tendency | Upward tendency |
| | Current direction | | Inner ring⇒outer ring | | Inner ring⇒outer ring | Inner ring⇒outer ring | Inner ring⇒outer ring | Inner ring⇒outer ring | Inner ring⇒outer ring |

| | | | Example 1 | | | | | Comparative Example 3 | |
|---|---|---|---|---|---|---|---|---|---|
| | | | Magnet type of rotor | | | | | | |
| | | | Ferrite resin magnet | | | | | Ferrite resin magnet | |
| | | | Capacitance of capacitor connected between stator iron core and bracket | | | | | | |
| | | | 10 | 50 | 100 | 150 | 300 | Presence of short circuit | |
| Conductivity between two brackets | | | Presence | | | | | Absence | Presence |
| Bearing on output shaft side | Shaft voltage | | 8 | 3 | 2 | 3 | 8 | 18 | 15 |
| | Shaft voltage waveform state | | Partial waveform collapse | No waveform collapse | No waveform collapse | No waveform collapse | Complete waveform collapse | Complete waveform collapse | Complete waveform collapse |
| | Direction of shaft voltage waveform | | Upward tendency | Upward tendency | Downward tendency | Downward tendency | Downward tendency | Downward tendency | Downward tendency |
| | Current direction | | Inner ring⇒outer ring | Inner ring⇒outer ring | Outer ring⇒inner ring | Outer ring⇒inner ring | Outer ring⇒inner ring | Outer ring⇒inner ring | Outer ring⇒inner ring |
| Bearing on anti-output shaft side | Shaft voltage | | | | Same as above | | | 38 | Same as above |
| | Shaft voltage waveform state | | | | | | | Complete waveform collapse | |
| | Direction of shaft voltage waveform | | | | | | | Upward tendency | |
| | Current direction | | | | | | | Inner ring⇒outer ring | |

As is apparent from Table 1, when bracket 17 and bracket 19 are electrically connected to each other, and when capacitors having capacitances of 50 pF to 150 pF are connected in series between bracket 17 and connection pin 42, the impedances can be matched with each other, and the shaft voltage can be lowered. When the shaft voltage is lowered, the number of times of waveform collapse (breakdown voltage of an oil film in the bearing) extremely decreases, and an effect of suppression of electric corrosion occurring in the bearing can be more enhanced. Furthermore, since bracket 17 and bracket 19 are electrically connected to each other to make the potentials of the brackets equal to each other, the same current direction can be obtained. Since a current does not flow through shaft 16 because bracket 17 and bracket 19 have the same potential, an effect of suppression of electric corrosion occurring in the bearing can be more enhanced.

Example 2

In Example 2, evaluations were performed while changing the types of magnets 32 held by rotor 14. The evaluations were performed by using a ferrite resin magnet and a neodymium magnet as magnets 32. In the configuration as shown in FIG. 1, when rotor 14 holds a ferrite resin magnet, a dielectric element having capacitance of 100 pF was connected in series between bracket 17 and connection pin 42 as capacitor 40. When rotor 14 holds a neodymium magnet, a dielectric element having capacitance of 150 pF was connected in series between bracket 17 and connection pin 42 as capacitor 40. The brushless motors of the two types were manufactured and evaluated by the same method as that in Example 1.

In order to check an electric corrosion suppressing effect in the above specification, the brushless motors were prepared, and the electric corrosion suppressing effects were checked by an electric corrosion endurance test.

The electric corrosion endurance test was executed under the conditions in which power supply voltage Vdc of a winding was set to 391 V, power supply voltage Vcc of the control circuit was set to 15 V, control voltage Vsp was set to 3 V, a rotating speed was set to 1000 r/min, a brushless motor attitude was set to make the shaft horizontal, an atmospheric temperature was 10° C., and no load was applied.

In order to accelerate electric corrosion in comparison with normal electric corrosion, a special bearing including seven iron balls: one iron ball and six ceramic balls was installed.

In the determination of electric corrosion, an electric corrosion lifetime is determined when abnormality in weighting and wavelike abrasion in the bearing are checked.

Comparative Example 4

In the configurations as shown in FIG. 7 and FIG. 10, a brushless motor in which a rotor is a ferrite resin magnet and a brushless motor in which a rotor is a neodymium magnet were manufactured and evaluated by the same method as that in Example 2.

Table 2 shows measurement results of Example 2 and Comparative Example 4.

Also in the electric corrosion endurance test result, an appropriate capacitor is connected between stator iron core 11 and bracket 17, and bracket 17 and bracket 19 are electrically connected to each other to make the electric corrosion lifetime about 3 to 6 times. In the electric corrosion endurance test shown in Table 2, an electric corrosion lifetime is indicated by time (h).

As is apparent from the results, the motor has a shaft voltage that is lower than that in a conventional motor and has an excellent effect of suppression of electric corrosion occurring in the bearing of the motor.

As described above, the motor according to the present invention includes: a stator including a stator iron core on which a winding is wound; a rotor including a rotating body that holds a permanent magnet in a circumferential direction to face the stator and a shaft that fastens the rotating body to penetrate a center of the rotating body; a bearing that supports the shaft; and two conductive brackets that fix the bearing, wherein the two brackets are electrically connected to each other, and an impedance adjusting member that adjusts impedances between the stator iron core and the electrically connected two brackets is arranged. For this reason, the bearing outer rings on the output shaft side and the anti-output shaft have the same potential, and a circuit in which no current flows between the bearing on the output shaft side and the bearing on the anti-output shaft can be obtained. Since the impedances of the two bearing outer rings are made equal to each other, the impedances can be easily approximated to the impedances of the bearing inner rings. The capacitances between the stator iron core and the brackets are adjusted to make it possible to match the impedances with each other. As a result, the shaft voltage can be reduced. In this manner,

TABLE 2

| | | | Comparative Example 4 | | | | Example 2 | |
| --- | --- | --- | --- | --- | --- | --- | --- | --- |
| | | | Magnet type of rotor | | | | | |
| | | | Ferrite resin magnet | | Neodymium magnet | | Ferrite resin magnet | Neodymium magnet |
| | | | Capacitance of capacitor connected between stator iron core and bracket | | | | | |
| | | pF | Absence of short circuit | Presence of short circuit | Absence of short circuit | Presence of short circuit | 100 | 150 |
| Conductivity between two brackets | | | Absence | | Absence | | Presence | Presence |
| Bearing on output shaft side | Shaft voltage | V | 17 | 18 | 25 | 18 | 2 | 2 |
| | Shaft voltage waveform state | | Complete waveform collapse | Complete waveform collapse | Complete waveform collapse | Complete waveform collapse | No waveform collapse | No waveform collapse |
| | Direction of shaft voltage waveform | | Upward tendency | Downward tendency | Upward tendency | Downward tendency | Downward tendency | Downward tendency |
| | Current direction | | Inner ring ⇒ outer ring | Outer ring ⇒ inner ring | Inner ring ⇒ outer ring | Outer ring ⇒ inner ring | Outer ring ⇒ inner ring | Outer ring ⇒ inner ring |
| Bearing on anti-output shaft side | Shaft voltage | V | 17 | 38 | 20 | 33 | Same as above | Same as above |
| | Shaft voltage waveform state | | Complete waveform collapse | Complete waveform collapse | Complete waveform collapse | Complete waveform collapse | | |
| | Direction of shaft voltage waveform | | Upward tendency | Upward tendency | Upward tendency | Upward tendency | | |
| | Current direction | | Inner ring ⇒ outer ring | Inner ring ⇒ outer ring | Inner ring ⇒ outer ring | Inner ring ⇒ outer ring | | |
| Electric corrosion resistance test | | h | ≦500 | 500-1000 | ≦500 | 500-1000 | 3000≦ | 3000≦ |

As is apparent from Table 2, when the magnet types of the rotors are changed, a shaft voltage can be easily lowered by changing a capacitor connected in series between bracket 17 and connection pin 42.

high-frequency potentials on the bearing inner ring side and the bearing outer ring side can be balanced, and the bearing can be suppressed from being electrically corroded by a high-frequency wave generated by PWM or the like. Therefore, according to the motor of the present invention, there can be provided a motor that suppresses electric corrosion from occurring in a bearing. The motor of the present invention is incorporated in an electric device to make it possible to provide the electric device including the motor that suppresses electric corrosion from occurring in a bearing.

In the present embodiment, an air variable capacitor (variable capacitor) is exemplified. However, in addition to the air variable capacitor, a dielectric element or a resistor element may be used if the impedances can be matched with each other.

In the present embodiment, although the impedance adjusting member is attached outside the motor, even though the impedance adjusting member is arranged in the motor, furthermore, on a pattern of a printed wiring board, the same effect as described above can be obtained.

Embodiment 2

As an example of the electric device according to the present invention, a configuration of an air conditioner indoor unit will be described as Embodiment 2 in detail.

Figure 12:
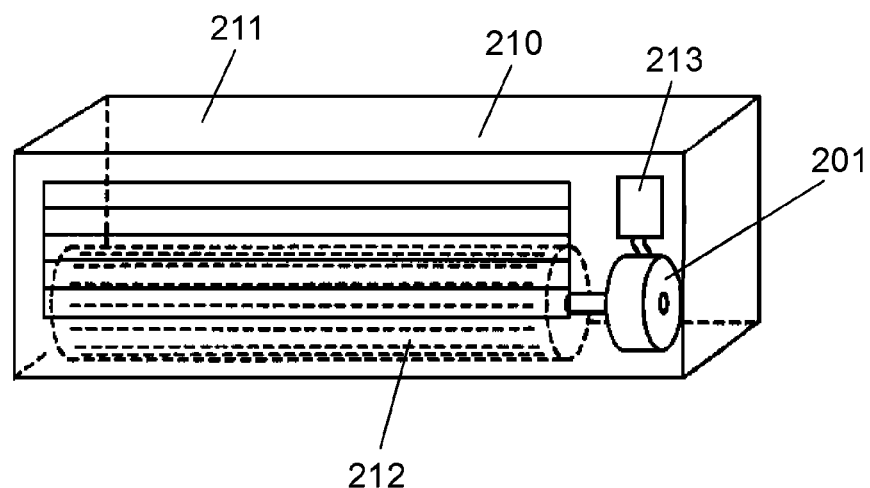
FIG. 12 is a structural diagram of an electric device (air conditioner indoor unit) in Embodiment 2 of the present invention.

In FIG. 12, motor 201 is mounted in housing 211 of air conditioner indoor unit 210. Cross flow fan 212 is attached to a rotating shaft of motor 201. Motor 201 is driven by motor drive device 213. By energization from motor drive device 213, motor 201 rotates. Accordingly, cross flow fan 212 rotates. With the rotation of cross flow fan 212, air conditioned by a heat exchanger (not shown) for an indoor unit is sent into a room. As motor 201, for example, the brushless motor described in Embodiment 1 can be applied.

The electric device according to the present invention includes a motor and a housing in which the motor is installed. As the motor, the motor according to the present invention having the above configuration is employed.

Embodiment 3

As an example of the electric device according to the present invention, a configuration of an air conditioner outdoor unit will be described as Embodiment 3 in detail.

Figure 13:
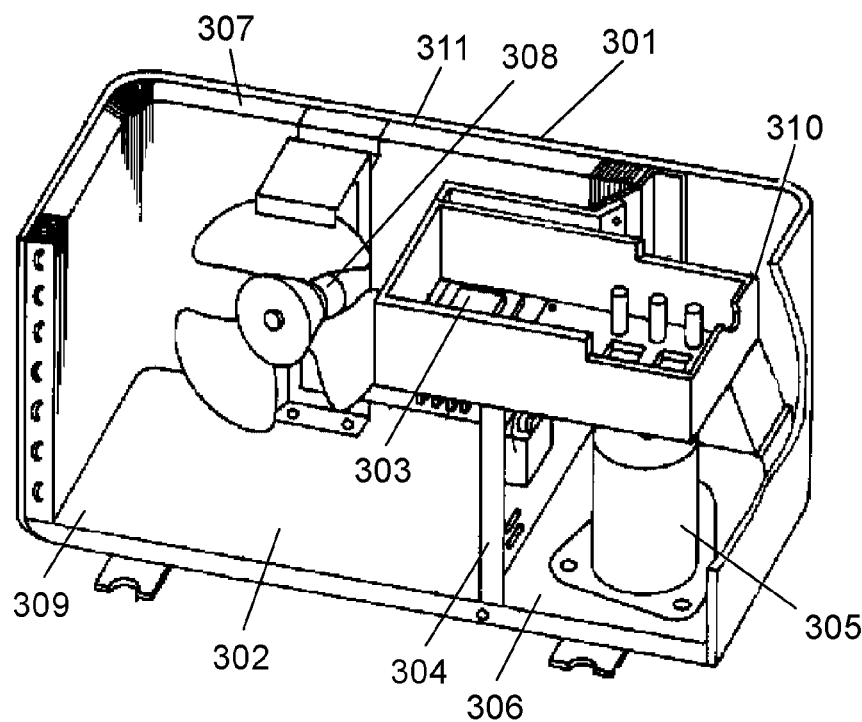
FIG. 13 is a structural diagram of an electric device (air conditioner outdoor unit) in Embodiment 3 of the present invention.

In FIG. 13, motor 308 is mounted in housing 311 of air conditioner outdoor unit 301. A fan is attached to a rotating shaft of motor 308. The motor functions as an air-blowing motor.

In air conditioner outdoor unit 301, compressor chamber 306 and heat exchanger chamber 309 are partitioned by partition board 304 upwardly extending from bottom board 302 of housing 311. Compressor 305 is arranged in compressor chamber 306. In heat exchanger chamber 309, heat exchanger 307 and the air-blowing motor are arranged. Electric component box 310 is arranged above partition board 304.

In the air-blowing motor, fan 312 rotates with rotation of motor 308 driven by motor drive device 303 stored in electric component box 310, and air is sent to heat exchanger chamber 309 through heat exchanger 307. As motor 308, for example, the brushless motor according to Embodiment 1 can be applied.

The electric device according to the present invention includes a motor and a housing in which the motor is installed. As the motor, the motor according to the present invention having the above configuration is employed.

Embodiment 4

As an example of the electric device according to the present invention, a configuration of a water heater will be described as Embodiment 4 in detail.

Figure 14:
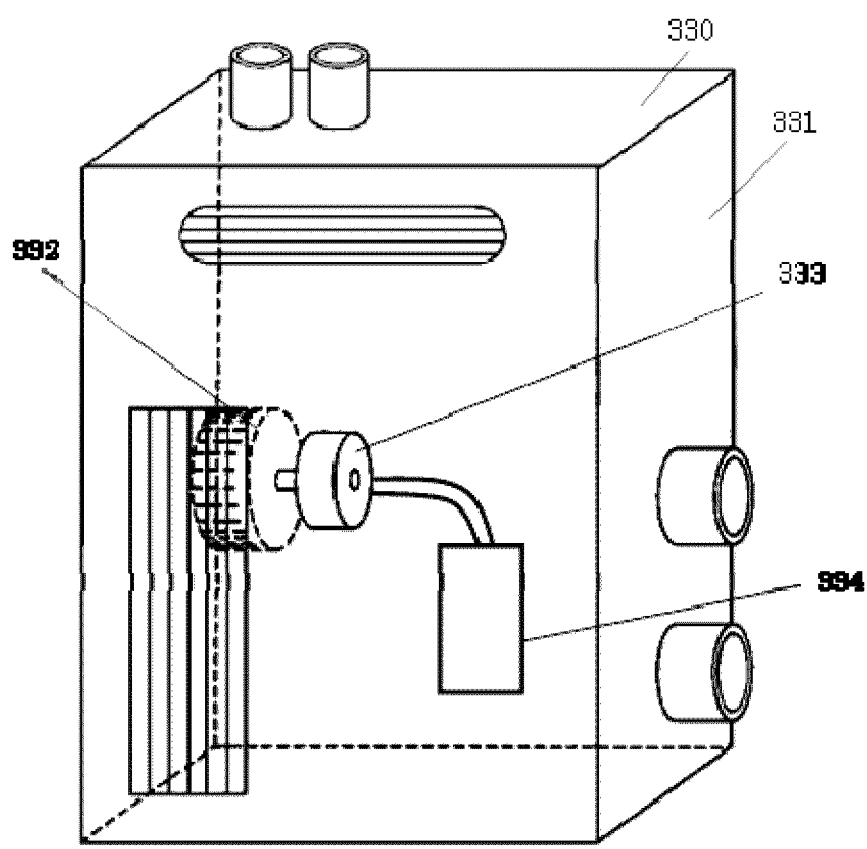
FIG. 14 is a structural diagram of an electric device (water heater) in Embodiment 4 of the present invention.

In FIG. 14, motor 333 is mounted in housing 331 of water heater 330. Fan 332 is attached to a rotating shaft of motor 333. Motor 333 is driven by motor drive device 334. By energization from motor drive device 334, motor 333 rotates. Accordingly, fan 332 rotates. With the rotation of fan 332, air required for combustion is sent into a fuel-vaporizing chamber (not shown). As motor 333, for example, the brushless motor according to Embodiment 1 can be applied.

The electric device according to the present invention includes a motor and a housing in which the motor is installed. As the motor, the motor according to the present invention having the above configuration is employed.

Embodiment 5

As an example of the electric device according to the present invention, a configuration of an air purifier will be described as Embodiment 5 in detail.

Figure 15:
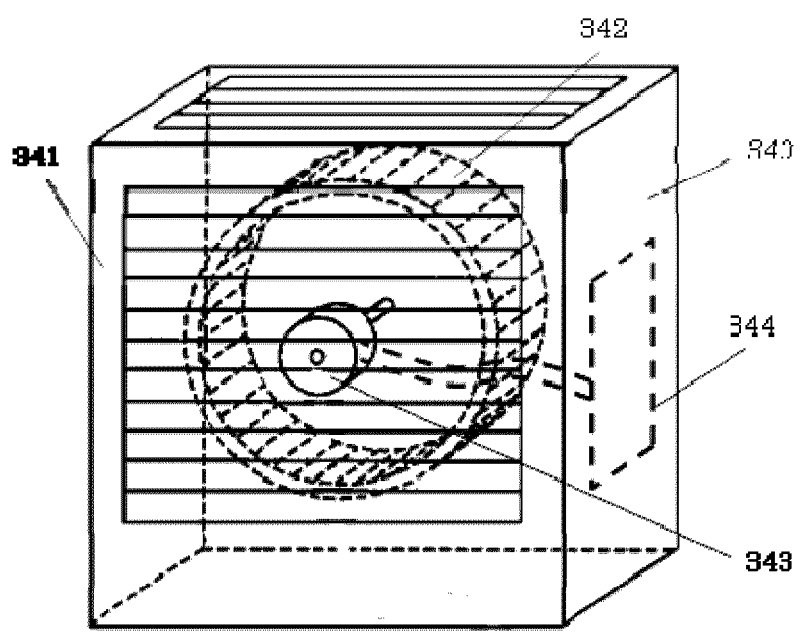
FIG. 15 is a structural diagram of an electric device (air purifier) in Embodiment 5 of the present invention.

In FIG. 15, motor 343 is mounted in housing 341 of air purifier 340. Air circulating fan 342 is attached to a rotating shaft of motor 343. Motor 343 is driven by motor drive device 344. By energization from motor drive device 344, motor 343 rotates. Accordingly, fan 342 rotates. With the rotation of fan 342, air is circulated. As motor 343, for example, the brushless motor according to Embodiment 1 can be applied.

The electric device according to the present invention includes a motor and a housing in which the motor is installed. As the motor, the motor according to the present invention having the above configuration is employed.

In the above description, as an example of the electric device according to the present invention, a motor installed in an air conditioner indoor unit, an air conditioner outdoor unit, a water heater, an air purifier, or the like is employed. However, the present invention can also be applied to another motor, a motor installed in various information devices, and a motor used in an industrial machine.

In the configuration in the application, as described above, a power supply circuit of a drive circuit (including a control circuit or the like) that inverter-drives a motor by a PWM system, a primary circuit of the power supply circuit, and the earth on the primary circuit side are electrically insulated from each other. Even though the configuration in which the stator iron core or the like of the motor is electrically connected to the earth in the conventional technique is not employed, an effect of suppressing electric corrosion in the bearing can be obtained.

INDUSTRIAL APPLICABILITY

The motor according to the present invention can reduce a shaft voltage, and suitably suppresses electric corrosion from occurring in a bearing. For this reason, mainly in an electric device that requires a low-price and long-life motor, the present invention is advantageously applied to a motor installed in, for example, air conditioner indoor unit, an air conditioner outdoor unit, a water heater, an air purifier, and the like.

The invention claimed is:
1. A motor comprising:
a stator including a stator iron core on which a winding is wound;
a rotor including a rotating body that holds a permanent magnet in a circumferential direction to face the stator and a shaft that fastens the rotating body to penetrate a center of the rotating body;
a bearing that supports the shaft; and two conductive brackets that fix the bearing, wherein the two brackets are electrically connected to each other, and the motor further includes an impedance adjusting member for adjusting an impedance between the stator iron core and the electrically connected two brackets.

2. The motor according to claim 1, wherein the impedance adjusting member is an impedance adjusting member that adjusts an impedance between the stator iron core and any one of the brackets.

3. The motor according to claim 1, wherein the two brackets are electrically connected and insulated from the stator iron core.

4. The motor according to claim 1, wherein at least one of the two brackets and the stator iron core on which the winding is wound are integrally molded together with an insulating resin.

5. The motor according to claim 1, wherein the two brackets are electrically connected to each other in the motor.

6. The motor according to claim 1, wherein the impedance adjusting member is a matching member that matches an impedance between the stator iron core and an inner ring of the bearing with an impedance between the stator iron core and an outer ring of the bearing.

7. The motor according to claim 6, wherein the matching member is a member having an impedance component.

8. The motor according to claim 7, wherein the matching member having the impedance component is at least one of a dielectric element and a resistor element.

9. The motor according to claim 1, comprising a pulse width modulation inverter that drives the winding wound on the stator iron core.

10. An electric device comprising a motor according to claim 1.

* * * * *